US012759812B2

(12) United States Patent
English

(10) Patent No.: US 12,759,812 B2
(45) Date of Patent: Oct. 13, 2026

(54) STOWABLE RACK SYSTEM FOR TRANSPORTING VARIOUS PAYLOADS

(71) Applicant: English Logistics Inc., Alliston (CA)

(72) Inventor: James David English, Egbert (CA)

(73) Assignee: English Logistics Inc., Alliston (CA)

( * ) Notice: Subject to any disclaimer, the term of this patent is extended or adjusted under 35 U.S.C. 154(b) by 0 days.

(21) Appl. No.: 18/501,222

(22) Filed: Nov. 3, 2023

(65) Prior Publication Data

US 2024/0150135 A1 May 9, 2024

Related U.S. Application Data

(60) Provisional application No. 63/422,220, filed on Nov. 3, 2022.

(51) Int. Cl.
*B65G 49/06* (2006.01)

(52) U.S. Cl.
CPC ...... *B65G 49/062* (2013.01); *B65G 2201/022* (2013.01)

(58) Field of Classification Search
CPC H01S 3/02; H01S 3/025; B65G 49/06; B65G 49/062; B65G 49/063; B65G 2201/022; B60P 3/002
See application file for complete search history.

(56) References Cited

U.S. PATENT DOCUMENTS 3,655,218 A * 4/1972 Taylor ..................... B60P 3/00 410/44
3,838,779 A * 10/1974 Dawson .................. B62B 3/108 414/793
3,848,917 A * 11/1974 O'Neal ..................... B60P 7/00 296/3
3,896,954 A * 7/1975 Dawson .................. B62B 3/108 414/812
4,193,736 A * 3/1980 Thomaswick ....... B65G 49/062 410/121
4,273,485 A * 6/1981 Fischer ................... B60P 3/002 410/97
4,527,826 A * 7/1985 O'Neal ................... B60P 3/002 105/238.1
4,626,017 A * 12/1986 Robertson ............... B60P 3/002 296/10

(Continued)

FOREIGN PATENT DOCUMENTS

BE 895722 A 5/1983
DE 202017102079 U1 * 6/2017 ............. B60P 3/002

(Continued)

*Primary Examiner* — Patrick D Hawn
(74) *Attorney, Agent, or Firm* — Own Innovation Inc.; James W. Hinton

(57) ABSTRACT

Provided are stowable rack systems and methods for transporting various payloads. A stowable rack system for hauling various payloads includes a trailer having a body with a top surface and a recessed well and a rack. The rack includes a plurality of A-frames, each A-frame movable between an upright position relative to the top surface of the trailer and a stowed position within the recessed well. When at least two A-frames of the plurality of A-frames are in the upright position the at least two A-frames are operable to carry a first payload. When the plurality of A-frames are in the stowed position the top surface is operable to carry a second payload.

13 Claims, 10 Drawing Sheets

(56) References Cited

U.S. PATENT DOCUMENTS

| | | | | | |
|---|---|---|---|---|---|
| 5,209,540 | A * | 5/1993 | Metler | B60P 3/002 296/25 |
| 5,411,360 | A * | 5/1995 | Hilliker | B65G 49/062 108/53.5 |
| 6,820,752 | B2 | 11/2004 | Jeskey et al. | |
| 8,376,291 | B1 | 2/2013 | Groves | |
| 8,403,142 | B2 * | 3/2013 | Rose | B65D 85/48 206/448 |
| 8,789,710 | B1 * | 7/2014 | Moore | B62B 1/20 211/41.14 |
| 9,428,095 | B2 * | 8/2016 | Belmont | B60P 3/002 |
| 10,106,294 | B2 * | 10/2018 | Böttcher | A47B 47/0075 |
| 10,336,528 | B2 * | 7/2019 | Fuller | B65D 88/129 |
| 10,518,688 | B2 * | 12/2019 | Vander Pol | B62D 33/02 |
| 10,688,904 | B2 * | 6/2020 | Reitnouer | B62D 21/20 |
| 11,613,288 | B2 * | 3/2023 | Burns | B62B 5/00 211/2 |
| 11,613,430 | B2 * | 3/2023 | English | B66F 9/18 414/815 |
| 11,713,161 | B2 * | 8/2023 | Servaes | B65D 85/48 211/41.1 |
| 11,851,266 | B2 * | 12/2023 | Schmitt | B65D 85/48 |
| 12,122,286 | B2 * | 10/2024 | Santa Cruz Ungson | B65D 88/12 |
| 2007/0272633 | A1 | 11/2007 | Gardner et al. | |
| 2015/0368029 | A1 * | 12/2015 | Kronsteiner | B65D 85/48 211/85.8 |
| 2019/0232858 | A1 * | 8/2019 | Dickson | B65D 19/44 |
| 2023/0033845 | A1 * | 2/2023 | Santa Cruz Ungson | B65D 19/44 |

FOREIGN PATENT DOCUMENTS

| | | | | |
|---|---|---|---|---|
| DE | 102016123145 | A1 * | 5/2018 | |
| DE | 202018106096 | U1 * | 3/2020 | |
| EP | 1745980 | A1 * | 1/2007 | B60P 1/02 |
| EP | 1845041 | A1 | 10/2007 | |
| FR | 3013339 | A1 * | 5/2015 | B60P 3/002 |

* cited by examiner

STOWABLE RACK SYSTEM FOR TRANSPORTING VARIOUS PAYLOADS

TECHNICAL FIELD

The embodiments disclosed herein relate to transport of goods and, in particular, to systems and methods enabling two-way transport of various payloads for a glass rack system.

INTRODUCTION

In the glass hauling industry, the loading and transport of panes of glass requires specialized equipment to minimize the risks of damage. Current glass transportation methods are expensive and inefficient. Glass-holding a-frame racks are only able to move glass and cannot move other freight which means deliveries can only go in one direction. These glass-holding racks are loaded onto trailers to deliver the glass to a destination and then either a single glass-holding rack is returned or multiple racks are loaded onto a single trailer to be transported back to collect more glass thereby wasting a trip for the trailer which carries the empty racks. Time is wasted in loading and unloading the racks from the trailers. Additionally, breaking down and storing the racks to use the trailer for other freight is a labor intensive process.

Recent developments in high tensile steel technology have enabled lower weight racks to be created which in turn enabled glass racks with foldable A-frames to be manufactured. However, these foldable racks merely enable an increase in the number of racks which can be transported on a return trip due to increasing the "stackability" of the racks. The return trip is still wasted when considering the movement of goods.

Accordingly, there is a need for a rack lifting system which eliminates the need for loading and unloading glass racks and also enables a trailer to be used for hauling other equipment or goods on return trips.

SUMMARY

A stowable rack system for hauling various payloads may include a trailer having a body with a top surface and a recessed well, a rack comprising a plurality of A-frames, each A-frame movable between an upright position relative to the top surface of the trailer and a stowed position within the recessed well, wherein when at least two A-frames of the plurality of A-frames are in the upright position the at least two A-frames are operable to carry a first payload, and when the plurality of A-frames are in the stowed position the top surface is operable to carry a second payload.

Each of the plurality of A-frames of the system may be connected to the trailer by a base beam. Each of the A-frames may be connected to the base beam by a hinge and the hinge may be pivotable to move the A-frame between the stowed position and the upright position.

The system may include a plurality of doors which when closed cover the recessed well, wherein when the A-frames are in the stowed position the doors enclose the A-frames within the recessed well and provide a floor to carry the second payload. Each A-frame of the plurality of A-frames may have a respective door.

Adjacent A-frames in the stowed position may be nested together within the recessed well such that a first A-frame sits within an interior of a second A-frame.

The system may include a cross brace connecting adjacent A-frames in the upright position. The cross brace may be permanently affixed to a first A-frame at a first end and removably connectable to an adjacent A-frame at a second end. The cross brace may be completely removable from the A-frames.

The system may include a support beam connecting the trailer to a first A-frame member in the upright position to brace the rack.

The system may include at least one gusset at the base of each of the plurality of A-frames to prevent the A-frames from moving past vertical when moving from the stowed position to the upright position.

The rack may be modular such that a first subset of the plurality of A-frames may be in the stowed position while a second subset of the plurality of A-frames may be in the upright position. The first subset may comprise adjacent A-frames and the second subset may comprise adjacent A-frames and the system may carry a first payload and a second payload simultaneously.

The trailer may include reinforced crossbeams on an underside of the carriage to support the recessed well of the trailer.

A method of carrying a first payload on a carrying system, wherein the carrying system includes a trailer having a top surface and a recessed well, and a stowable rack comprising a plurality of A-frames movable between a stowed position within the recessed well and a upright position relative to the top surface, may include moving at least two A-frames of the plurality of A-frames from the stowed position to the upright position, and loading a first payload onto the at least two A-frames.

The method may further include unloading the first payload, moving the at least two A-frames from the upright position to the stowed position, and loading a second payload onto the trailer.

When the carrying system further includes doors which when closed cover the recessed well and enclose any of the plurality of A-frames which are in the stowed position, the method may further include opening the doors before moving the at least two A-frames from the stowed position to the upright position, and closing the doors after moving the at least two A-frames from the stowed position to the upright position.

The method may further include opening the doors before moving the at least two A-frames from the upright position to the stowed position, and closing the doors after moving the at least two A-frames from the upright position to the stowed position, and loading a second payload onto the trailer may further include loading a second payload onto the closed doors.

The method may further include connecting adjacent A-frames in the upright position by a cross brace.

The method may further include connecting at least one A-frame in the upright position to the trailer by a support beam.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Described below are systems and methods for a stowable rack system that can be used to haul various payloads including glass without the need for loading and unloading a glass rack or for stacking multiples glass racks together for return transport. Eliminating the requirement to load and unload glass racks from a trailer decreases the amount of time with must be spent to prepare the racks, trailer, and glass for transport. Eliminating the need to waste a trip by returning the racks without moving any payload saves time and money.

The A-frames described herein may use metals which are lighter weight than conventional metals and enable each A-frame to be safely and easily moved from stowed to upright. The A-frames described herein may be the same size as conventional A-frames used for glass hauling.

Figure 1B:
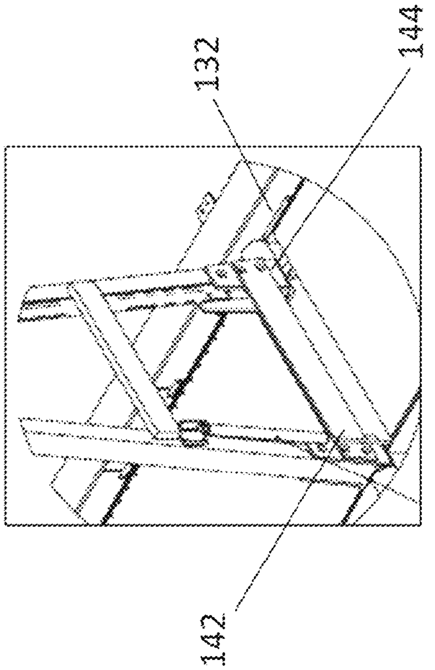
FIG. 1B is a close-up of the base of an A-frame in the stowable rack system of FIG. 1A.
Figure 1A:
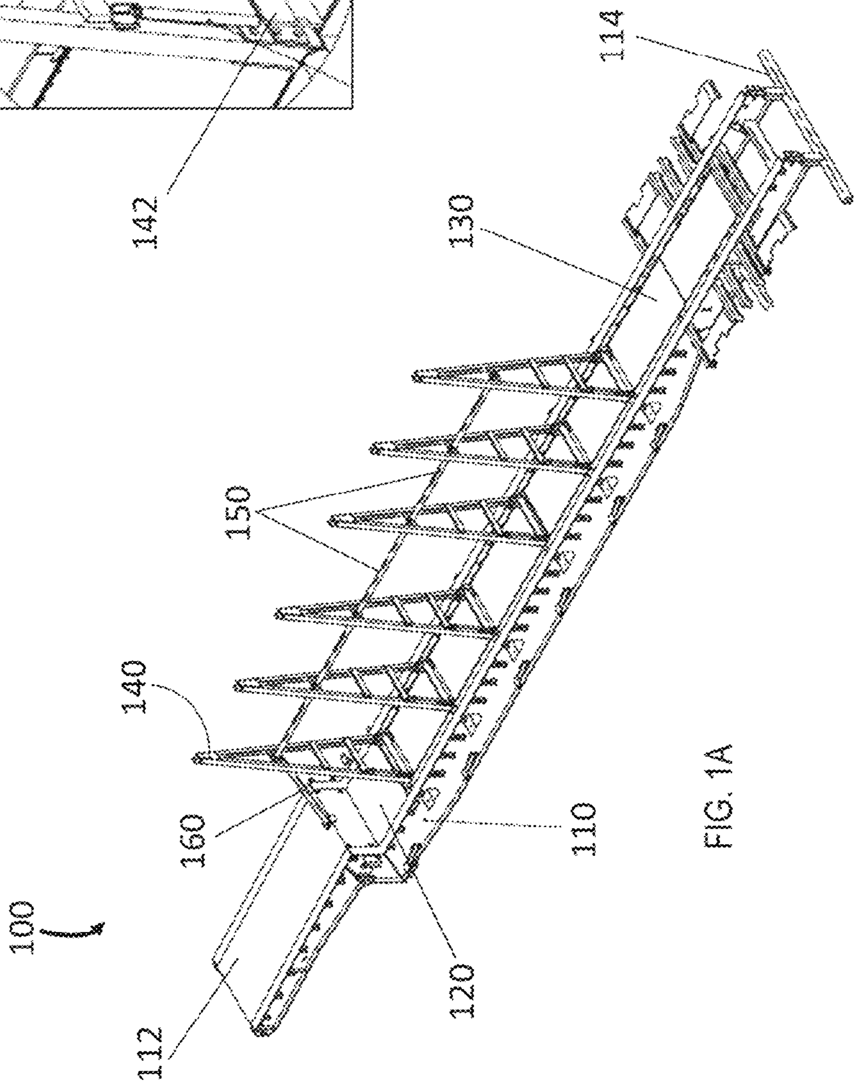
FIG. 1A is a perspective view of a stowable rack system, according to one embodiment.

Referring to FIG. 1A, illustrated therein is a perspective view of a stowable rack system 100 according to an embodiment. Stowable rack system 100 includes a trailer 110 having a top surface 120 and a recessed well 130, a plurality of A-frames 140 (only one labelled to reduce clutter), a plurality of cross braces 150 (only one labelled to reduce clutter), and a support beam 160.

The trailer 110 may be any trailer which is capable of including, or being adapted to include, the other elements of the stowable rack system 100 as described herein. In FIG. 1, the trailer 110 has a front end 112 and a back end 114. The front end 112 would be connected to a tractor or other vehicle capable of connecting to and moving the trailer 110 when in use. Although not shown, it is to be understood that the trailer 110 and all other trailer embodiments herein may comprise or be mounted on wheels or another movable part(s) for towing/driving the trailer.

The trailer 110 includes the top surface 120 which is horizontal (parallel to the ground in use) and the recessed well 130. The recessed well 130 has a bottom surface which is parallel to and lower than the top surface 120 from which the recessed well is recessed.

Each of the plurality of A-frames 140 is connected at a base to the trailer wherein the base is disposed within the recessed well 130. Each A-frame is movable between a first stowed position (see FIG. 4B) wherein the entirety of the A-frame is within the recessed well 130 and below the top surface 120 and a second upright position (shown in FIG. 1) wherein the A-frame is perpendicular relative to the top surface 120 of the trailer 110.

Referring now to FIG. 1B, shown therein is a close-up of a base of an A-frame. Each A-frame is connected to the trailer by a base beam. The base beam distributes the weight of the A-frames and any payload carried on the A-frames. The base beam may be a 6×6 beam. Each A-frame has at least one hinge which is attached to the base beam and enables the A-frame to move from the stowed position to the upright position. A gusset or angle-iron may be present on the floor of the recessed well to prevent the hinge and the A-frame from moving past an upright position relative to the floor of the recessed well.

FIG. 1C shows the A-frame may be connected to the trailer in other ways. For example, a base 142 of the A-frame may be pivotably disposed on and pivotable around a pair of connectors 144 (only one visible in FIG. 1C) attached to the trailer at a first sidewall 132 of the recessed well 130 and second sidewall (not visible) of the recessed well 130. In some embodiments, the base of the A-frame is shaped and/or positioned on the connectors such that the A-frame can only be pivoted from the stowed position to the upright position and cannot move past the upright position (i.e., can only move through 90°). In other embodiments, the base of the A-frame may be shaped or positioned on the connectors such that the A-frame could freely move through 180° but for at least one gusset or angle iron which prevents the A-frame from moving past the upright position.

In other embodiments, a base beam may be cylindrical, and the A-frame may be pivotable around the cylindrical base beam.

The depth of the recessed well may be equal to the height of the base beam. The depth of the recessed well may be equal to a height of the A-frame when in a stowed position. The depth of the recessed well may be greater than either the height of the base beam or the height of the A-frame when stowed. The height of the base beam and the height of the A-frame when stowed may be different or may be the same.

FIG. 1A shows six A-frames in the second upright position with five cross braces 150 attached between the plurality of A-frames to provide support. A support beam 160 is attached to the trailer 110 and to the A-frame closest to the front end 112 to provide support for the A-frames. In other embodiments there may be more or fewer cross braces, possibly none, and they may be located in another location relative to the A-frames. In some embodiments the cross braces and support beam may be completely removable from the A-frames, wherein when the A-frames are brought into the upright position the cross brace or support beam is connected to an A-frame at a first end and to an adjacent A-frame (or the trailer 110 for the support beam) at a second end. In other embodiments, each cross brace or support beam may be fixed, at one end, to a respective A-frame. That is each cross brace or support beam may be movably fixed to an A-frame such that the cross brace/support beam is attached to the A-frame when the A-frame is stowed in the recessed well 130 in the horizontal position and also lies relatively parallel to the A-frame within the recessed well 130. Wherein, when the A-frames are moved into the upright position the cross brace is moved into a perpendicular position relative to the A-frame and connected to an adjacent A-frame, and the support beam is moved to connect to the trailer.

In FIG. 1A, the A-frames are in the upright position and glass, or another payload, could be placed thereon for transport. When the A-frames are stowed in the recessed well the trailer may carry a different payload on the top surface 120. As shown and discussed below in FIGS. 4A-4C, the stowable rack system may include doors which cover the A-frames when they are in the stowed position. In such a system the doors would be co-planar with the top surface of the trailer and the payload would rest on the doors.

In the arrangement shown in FIG. 1A, all of the A-frames are in the upright position. In other arrangements, some of the A-frames may be stowed while others are upright. This may enable the transport of a payload (e.g., glass) on the upright A-frames while simultaneously transporting a second payload on the top surface 120 of the trailer 110. For example, the three A-frames closest to the front end 112 may be upright and the three A-frames closest to the back end 114 may be stowed enabling glass to be transported on the front three A-frames and a non-glass payload to be transported on top of the stowed back three A-frames.

Figure 2:
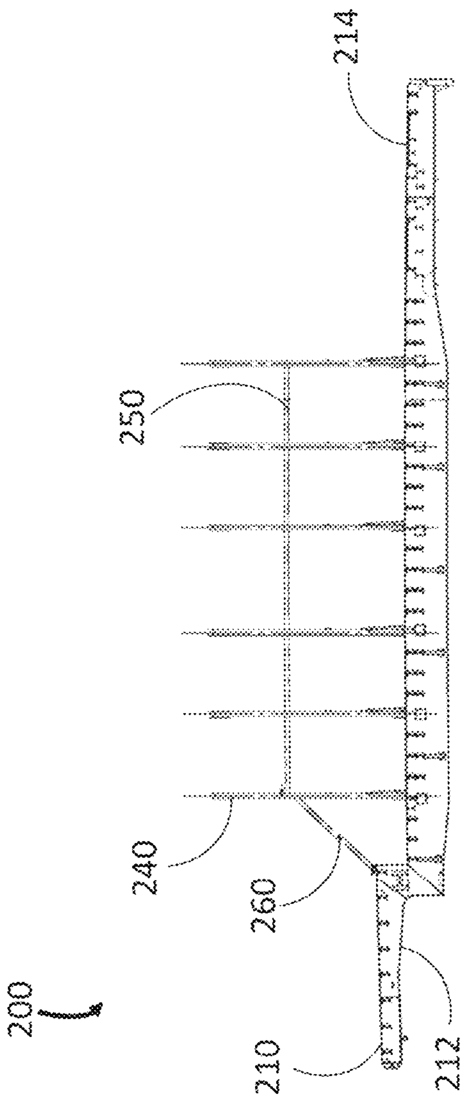
FIG. 2 is a side view of the stowable rack system as shown in FIG. 1, according to one embodiment.

Referring now to FIG. 2, shown therein is a side view of a stowable rack system 200 according to one embodiment. Stowable rack system 200 may be similar to stowable rack system 100 of FIG. 1A. The system 200 includes a trailer 210 with a front end 212 and a back end 214, six A-frames 240 (only one labelled to reduce clutter), five cross braces 250 (only one labelled to reduce clutter), and a support beam 260. The A-frames 240 are in the upright position and are supported by the cross braces 250 and the support beam 260. Due to the side perspective, the recessed well, in which the A-frames 240 sit, is not visible. From the side view perspective, if the A-frames 240 were in the stowed position within the recessed well there would not be visible.

Figure 3:
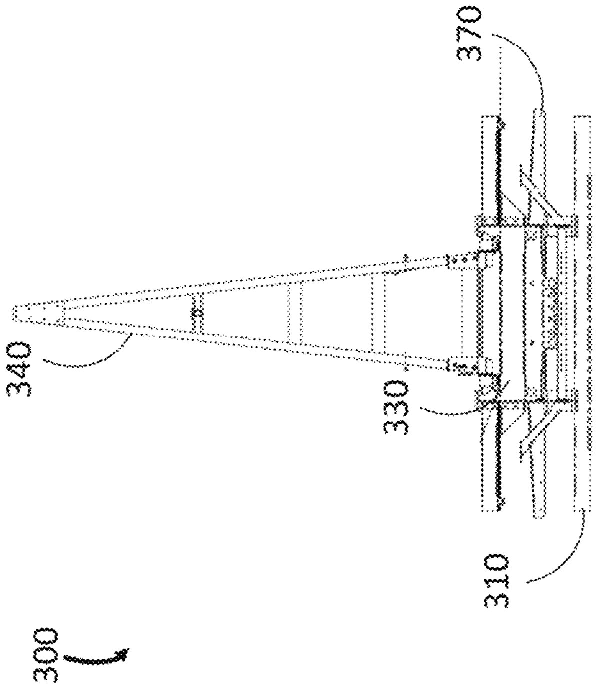
FIG. 3 is an end view of the stowable rack system as shown in FIGS. 1 and 2, according to one embodiment.

Referring now to FIG. 3, shown therein is an end view of a stowable rack system 300 according to one embodiment. Stowable rack system 300 may be similar to stowable rack systems 100 and 200 of FIG. 1A and FIG. 2, respectively.

The system 300 includes a trailer 310, a recessed well 330, an A-frame 340 in an upright position, and a cross beam 370. The stowable rack system 300 is shown from the back end of the trailer 310. The stowable rack system 300 may also include cross braces and a support beam. Cross beam 370 provides additional support to the trailer 310 than what is normally required for a trailer bed, but which in a stowable rack system may be required due to the presence of the recessed well.

Figure 4A:
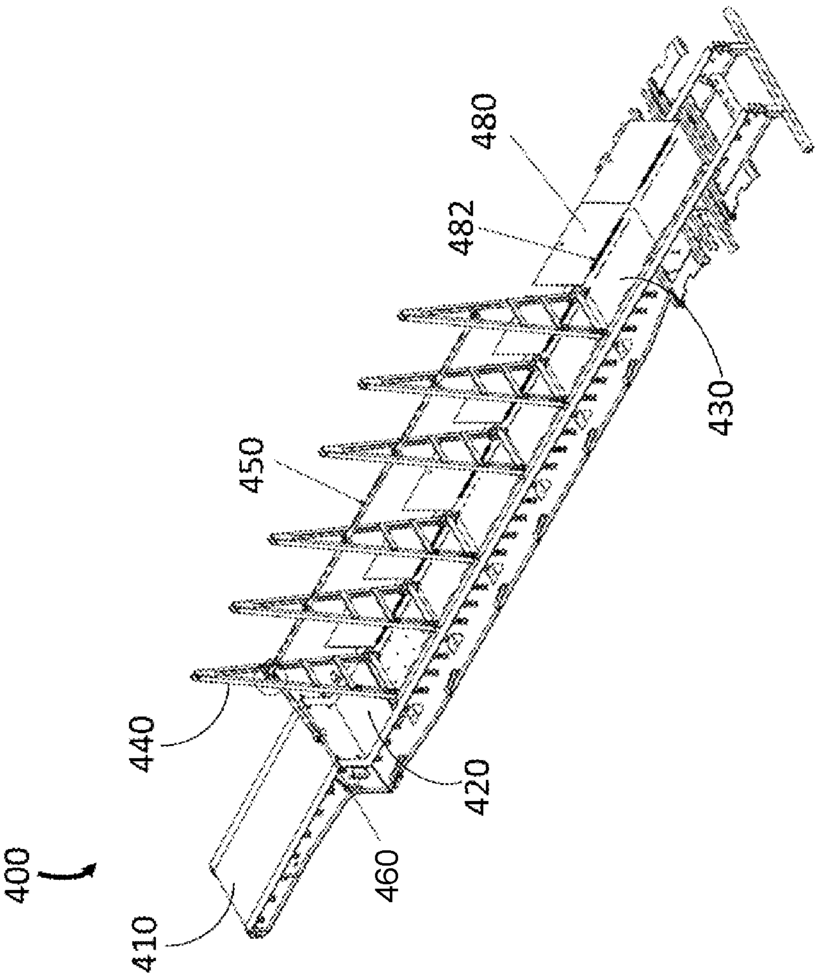
FIG. 4A is a perspective view of a stowable rack system with upright A-frames and open doors, according to one embodiment.
Figure 4B:
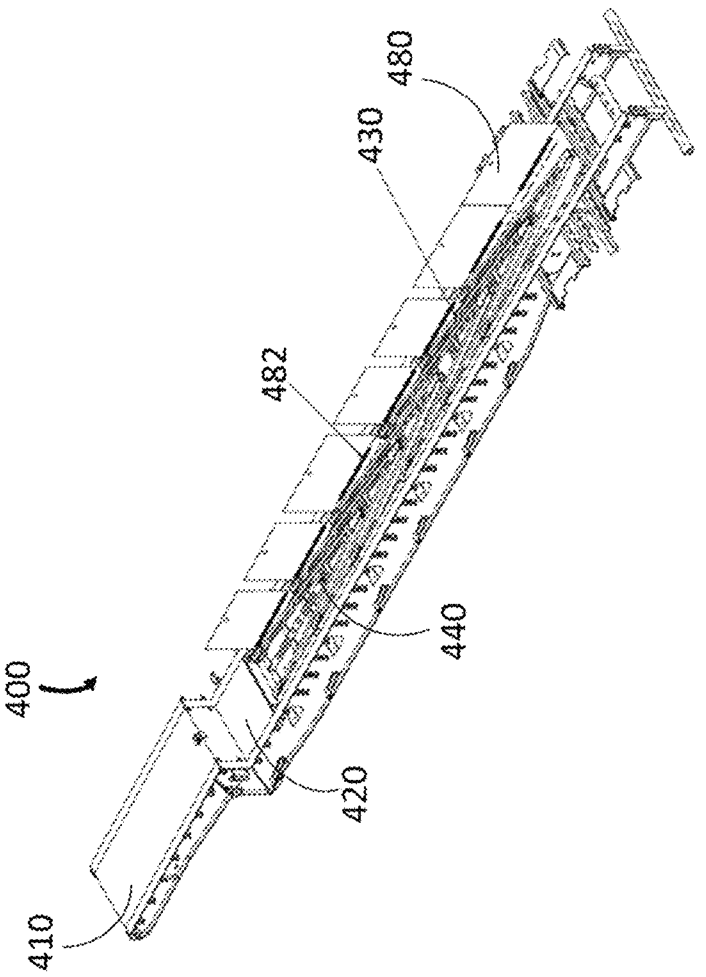
FIG. 4B is a perspective view of the stowable rack system of FIG. 4A with stowed A-frames and open doors, according to one embodiment.
Figure 4C:
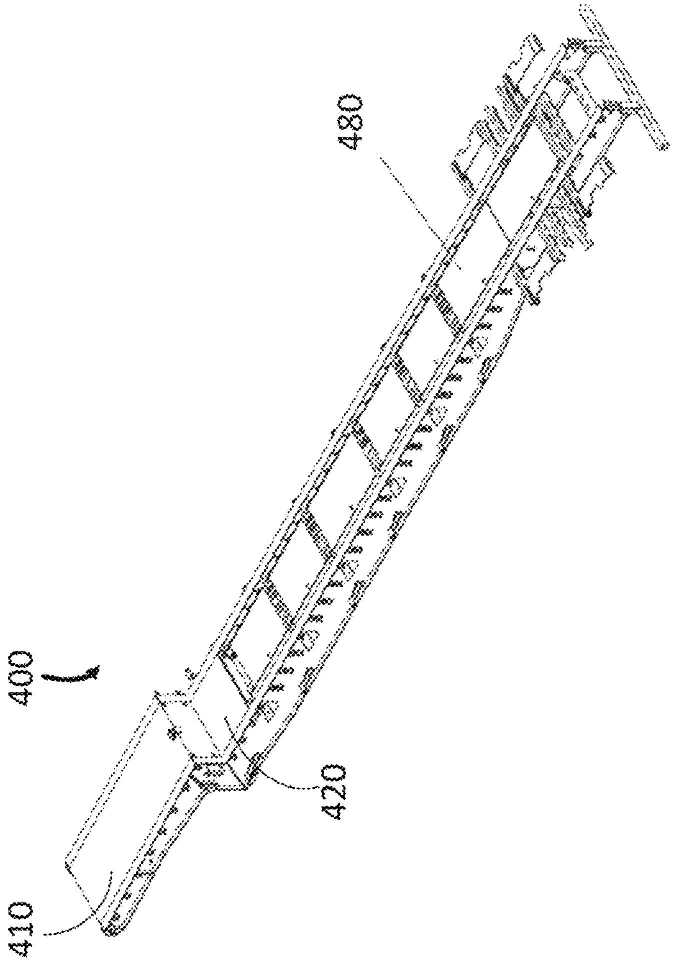
FIG. 4C is a perspective view of the stowable rack system of FIGS. 4A and 4B with stowed A-frames and closed doors, according to one embodiment.

Referring now to FIGS. 4A-4C, shown therein are perspective views of a stowable rack system 400 with doors 480. The stowable rack system 400 may be similar to stowable rack system 100, 200, and 300 of FIG. 1, FIG. 2, and FIG. 3, respectively.

The stowable rack system 400 includes a trailer 410, a plurality of A-frames 440 (only one labelled to reduce clutter), a plurality of cross braces 450 (only one labelled to reduce clutter), a support beam 460, and a plurality of doors 480 attached by hinges 482 to the trailer.

The trailer 410 has a top surface 420 and a recessed well 430. The recessed well 430 has a bottom surface which is lower than the top surface 420 of the horizontal floor from which the recessed well is recessed. When closed the plurality of doors 480 are on the same plane as the top surface 420 and each door encloses a portion of the recessed well. Together the top surface 420 and at least some of the closed plurality of doors 480 support a payload.

For stowable rack system 400 there are seven doors 480 which can open and close to enable movement of the plurality A-frames 440 between the upright and stowed positions. In other embodiments there may be one door per A-frame.

There is a space between each of the adjacent doors which is equal to or greater than a width (as measured from the front of the trailer to the back) of the A-frames 440. The spaces may be different sizes or all the same size. The spaces enable the A-frames 440 to be in the upright position while the doors are closed.

The base beam of each A-frame may have a height equal to the depth of the recessed well such that when the A-frames are in the stowed position and the door are closed, a top surface of each base beam and the surface of the doors are coplanar and a payload is in contact with the top surface of the base beams. Alternatively, the height of the base beam may be less than the depth of the recessed well and there may be gaps between the doors, wherein a payload is only supported by the doors and the top surface 420 of the trailer 410.

Referring now to FIG. 4A, shown therein is a perspective view of the stowable rack system 400 with upright A-frames and open doors. Each of the six A-frames 440 is in the upright position with cross braces 450 and support beam 460 supporting the A-frames 440. Each of the seven doors 480 is open.

Referring now to FIG. 4B, shown therein is a perspective view of the stowable rack system 400 with stowed A-frames and open doors. Each of the six A-frames 440 is in the stowed position. The A-frames 440 nest together within the recessed well 430. That is, each A-frame (except the A-frame closest to the back of the trailer) is within the "A" shape of the next A-frame (the A-frame which is the next closest to the back of the trailer) such that the top of each A-frame is between the base and the top of the next A-frame. Each of the seven doors 480 is open.

In other embodiments, the A-frames may fold towards the front of the trailer.

In other embodiments, some of the A-frames may fold towards the back of the trailer and some of the A-frames may fold towards the front of the trailer.

In other embodiments, pairs of A-frames may fold towards each other wherein one of the A-frames is stacked on top of the other A-frame.

Referring now to FIG. 4C, shown therein is a perspective view of the stowable rack system 400 with stowed A-frames and closed doors. Each of the six A-frames 440 is in the stowed position and the doors are closed. In the spaces next to the doors can be seen the base beams of each A-frame 440.

Figure 5A:
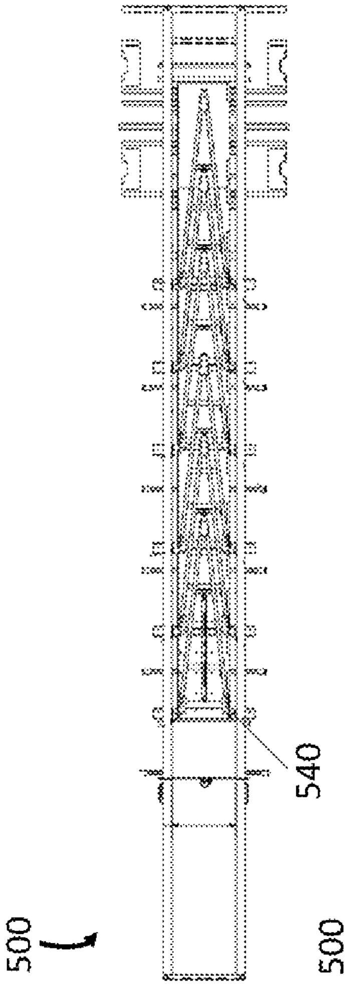
FIG. 5A is a top view of a stowable rack system with stowed A-frames as shown in FIG. 4B, according to one embodiment.

Referring now to FIG. 5A, shown therein is a top view of a stowable rack system 500 with stowed A-frames as similarly shown in FIG. 4B.

FIG. 5A shows a top view of the same configuration of A-frames 540 and doors as FIG. 4B. That is, the A-frames 540 are stowed within the recessed well and are nested together as described for FIG. 4B and the doors are open.

Figure 5B:
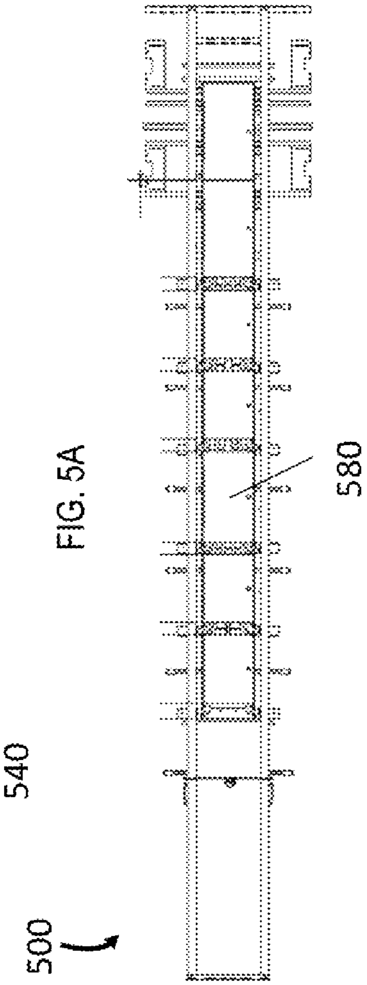
FIG. 5B is a top view of a stowable rack system with stowed A-frames and closed door as shown in FIG. 4C, according to one embodiment.

Referring now to FIG. 5B, shown therein is a top view of a stowable rack system 500 with stowed A-frames and closed door as similarly shown in FIG. 4C.

FIG. 5B shows a top view of the same configuration of A-frames and doors 580 as FIG. 4C. That is, the A-frames are stowed within the recessed well and the doors 580 are closed.

In FIGS. 1A-5B, each of the plurality of A-frames are shown in the same position. That is, all of the A-frames are in the upright position or all of the A-frames are in the stowed position. However, in some situations a first subset of adjacent A-frames may be in the upright position while a second subset of adjacent A-frames may be in the stowed position enabling a first payload to be carried on the first subset while a second payload is simultaneously carried on the top surface of the trailer above the second subset.

For example, in a stowable rack system with six A-frames, as shown herein, the front three A-frames may be in the upright position and may carry a first payload of glass while the back three A-frames may be in the stowed position and a second payload may be carried on the top surface of the trailer above the back three A-frames.

Figure 6:
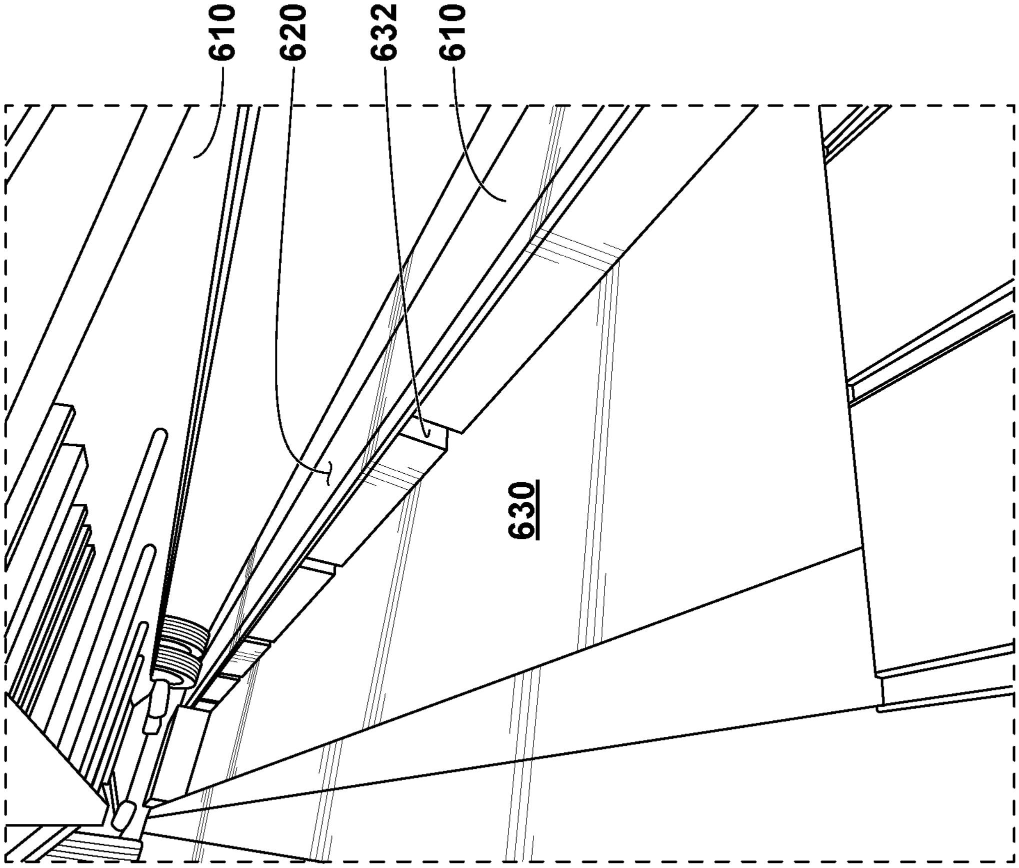
FIG. 6 is a perspective view showing a recessed well in a trailer of a stowable rack system, according to one embodiment.

Referring now to FIG. 6, shown therein is a perspective view of a recessed well of a trailer, according to one embodiment.

FIG. 6 shows a trailer 610 with another trailer on top. The trailer 610 does not include all of the other elements of the stowable rack system as described above but the FIG. 6 shows a recessed well 630 in which A-frames could be placed. Holes 632 (only one labelled to reduce clutter) could receive the components necessary to connect the A-frames to the trailer 610 (e.g., a base beam could fit into the holes or an element which a base beam is pivotable around could fit into the holes. Top surface 620 is also seen.

Figure 7:
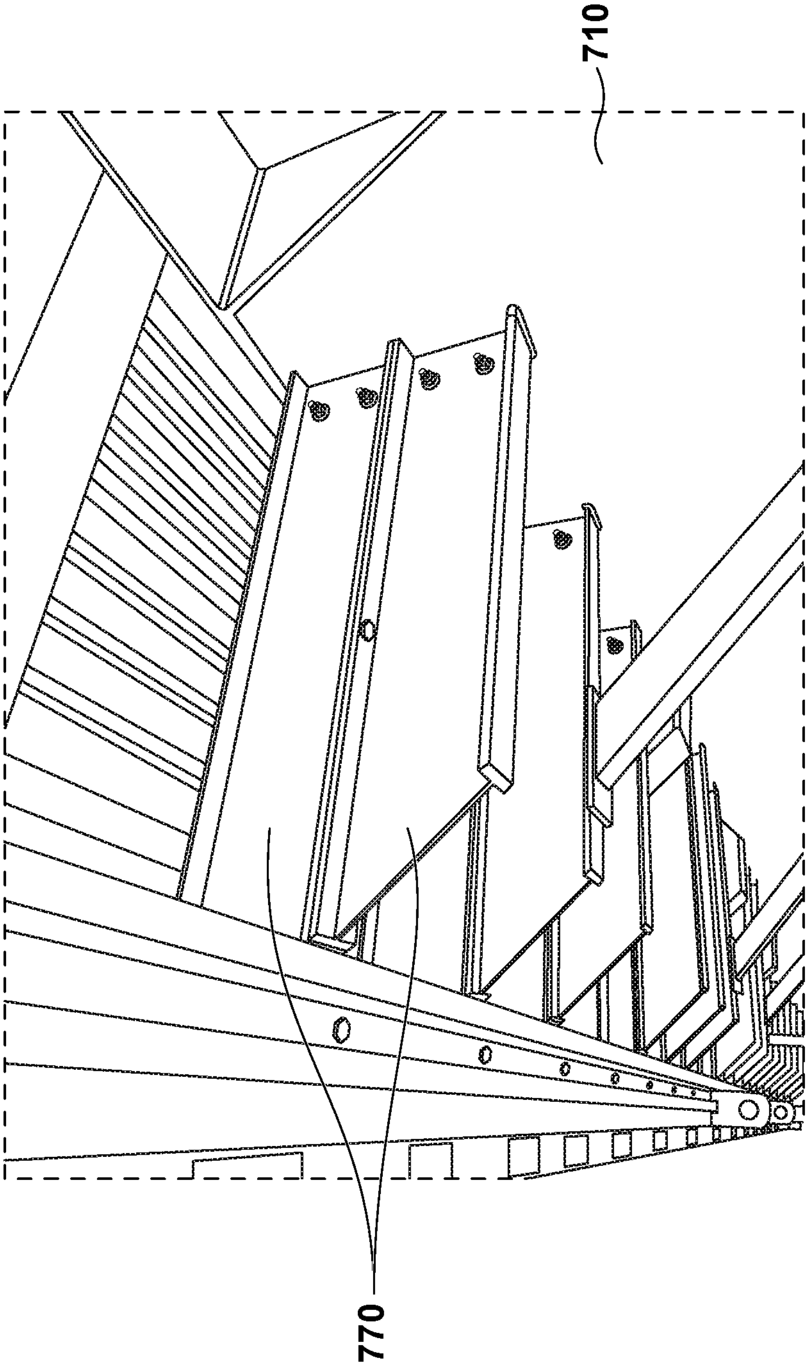
FIG. 7 is a perspective view showing reinforced cross-beams of a stowable rack system, according to one embodiment.

Referring now to FIG. 7, shown therein is a perspective view of reinforced crossbeams of a trailer 710, according to one embodiment.

FIG. 7 shows the underside of the trailer 710 which is the same trailer as trailer 610 of FIG. 6. Due to the shape of the trailer 710 wherein there is a top surface and a recessed well and to the extra weight added to the trailer by the plurality of A-frames, the trailer 710 needs greater support than a conventional trailer. A conventional trailer would have I-beams disposed across the width of the trailer to provide support. Crossbeams 770 of the trailer 710 are stacked I-beams which provide greater support than a single I-beam, as in a conventional trailer. The stacked I-beams may be present at every twelve inches along the length of the recessed well to support the A-frames and the recessed well.

Figure 8:
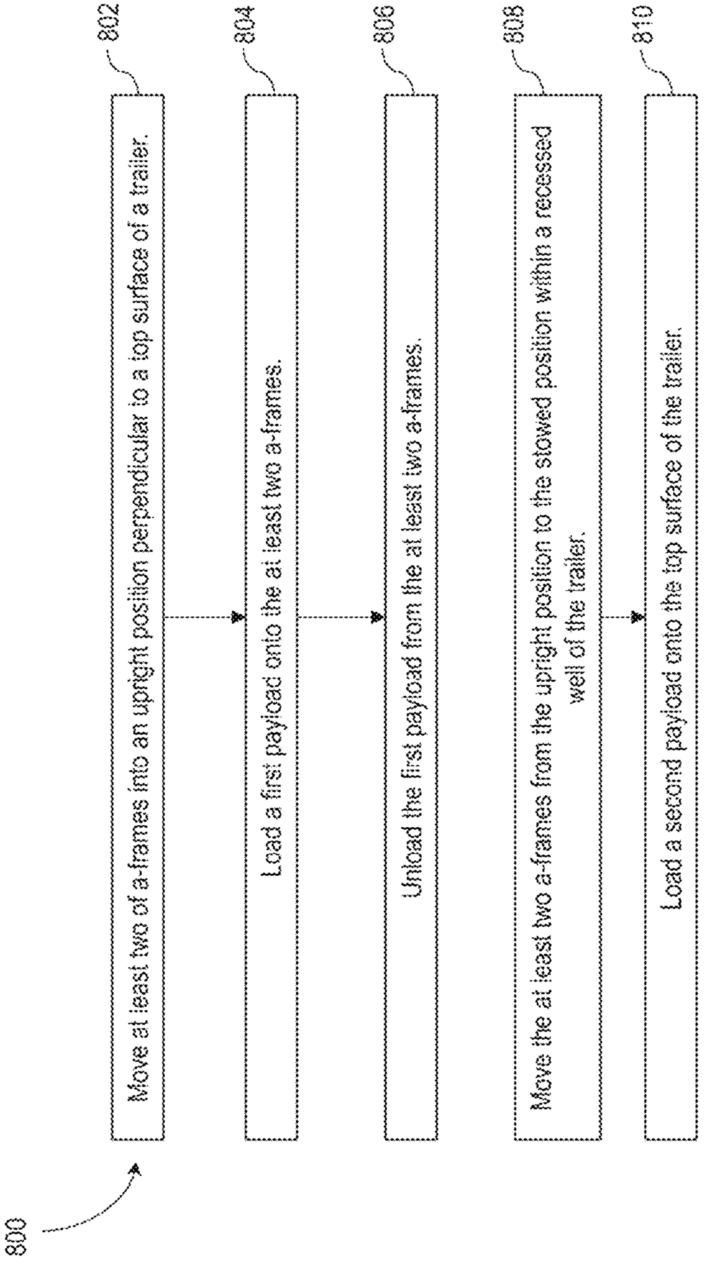
FIG. 8 is a flowchart of a method of using a stowable rack system, according to an embodiment.

FIG. 8 is a flowchart of a method 800 of using a stowable rack system to hold a first payload and a second payload, according to an embodiment. The stowable rack system of FIG. 8 may be similar to any of the stowable rack systems of FIGS. 1-5B. The stowable rack system of FIG. 8 includes a trailer having a top surface and a recessed well and a plurality of A-frames movable between a stowed position within the recessed well and an upright position perpendicular to the top surface of the trailer.

At 802, at least two of the plurality of A-frames are moved into the upright position from the stowed position. As described above, moving the A-frame may include pivoting a hinge which is connected to a base beam of the A-frame, wherein the base beam is connected to the floor of the recessed well and to the trailer. In other embodiments, as described above, the A-frame may move in other ways.

The A-frames may be held down by a latch or a lock when in the stowed position and moving the A-frames to the upright position may include unlatching/unlocking the A-frames from the stowed position.

The A-frames may be supported in the upright position by cross braces wherein a first end of a cross brace is connected to a first A-frame and a second end of the cross brace is connected to an adjacent second A-frame. The A-frames may be supported in the upright position by a support beam wherein a first end of the support beam may be connected to a first A-frame and a second end of the support beam may be connected to the trailer. The cross braces and support beam may be completely removable from the A-frames/trailer or may be continuously connected at one end to the A-frames/trailer. When the cross braces and support beam are completely removable they may be stored within the recessed well when not in use.

In some embodiments, the stowable rack system may include a plurality of doors which cover the recessed well and therefore can cover any A-frames in the stowed position. In these embodiments the doors may be opened to enable the movement of the at least two A-frames from the stowed position to the upright position and the doors may be closed when the at least two A-frames are in the upright position to enclose the empty section of recessed well which the A-frame is no longer occupying.

At 804, a first payload (e.g., glass) is loaded onto the at least two A-frames in the upright position. Any number of A-frames greater than two may be in the upright position and any volume of glass or other payload which can be supported by the upright A-frames may be loaded onto the A-frames.

At 806, the first payload is unloaded from the at least two A-frames.

At 808, the at least two A-frames in the upright position are moved into the stowed position within the recessed well of the trailer. When cross braces and/or a support beam were used to support the upright A-frames the cross braces and support beam are disconnected from the A-frames at one or both ends to enable the A-frames to be moved into the stowed position.

In embodiments with doors, the doors are opened to provide access to the recessed well to enable movement of the at least two A-frames from the upright position to the stowed position. The doors are then closed to cover the stowed A-frames and provide a flat surface coplanar to the top surface of the trailer.

At 810, a second payload is loaded onto the top surface of the trailer. In embodiments with doors, the second payload is also loaded onto the closed doors. In an embodiment without doors, the payload may rest directly on the stowed A-frames or not depending on the depth of the recessed well relative to a height of the A-frames in the stowed position.

In FIG. 8, it is discussed that a first payload carried on the upright A-frames and a second payload carried on the top surface of the trailer are not carried simultaneously. However, in some circumstances where a first subset of A-frames are in a upright position and a second subset of A-frames are in the stowed position, a first payload may be carried on the first subset of A-frames in the upright position and a second payload may be carried on the top surface of the trailer above the second subset of A-frames in the stowed position.

While the above description provides examples of one or more apparatus, methods, or systems, it will be appreciated that other apparatus, methods, or systems may be within the scope of the claims as interpreted by one of skill in the art.

The invention claimed is:

1. A stowable rack system for hauling various payloads, the system comprising:

a trailer having a body with a top surface and a recessed well;

a rack comprising:

a plurality of A-frames, wherein each A-frame of the plurality of A-frames is independently movable between a vertical upright position relative to the top surface of the trailer and a stowed position within the recessed well, wherein in the stowed position adjacent A-frames are nested together within the recessed well such that a first A-frame sits within an interior of a second A-frame, and wherein:

when at least two A-frames of the plurality of A-frames are in the vertical upright position the at least two A-frames are operable to carry a first payload; and when the plurality of A-frames are in the stowed position the top surface is operable to carry a second payload.

2. The system of claim 1, wherein each of the plurality of A-frames is connected to the trailer by a base beam.

3. The system of claim 2, wherein each A-frame of the plurality of A-frames is connected to the base beam by a respective hinge and each hinge is pivotable to move the respective A-frame between the stowed position and the vertical upright position.

4. The system of claim 1 further comprising a plurality of doors which when closed cover the recessed well, wherein when the A-frames are in the stowed position the doors enclose the A-frames within the recessed well and provide a floor to carry the second payload.

5. The system of claim 4, wherein each A-frame of the plurality of A- frames has a respective door.

6. The system of claim 1 further comprising a cross brace connecting adjacent A-frames in the vertical upright position.

7. The system of claim 6, wherein the cross brace is permanently affixed to a first A-frame at a first end and removably connectable to an adjacent A-frame at a second end.

8. The system of claim 6, wherein the cross brace is completely removable from the A-frames.

9. The system of claim 1 further comprising a support beam connecting the trailer to a first A-frame member in the vertical upright position to brace the rack.

10. The system of claim 1 further comprising at least one gusset at the base of each of the plurality of A-frames to prevent the A-frames from moving past vertical when moving from the stowed position to the vertical upright position.

11. The system of claim 1, wherein the rack is modular such that a first subset of the plurality of A-frames may be in the stowed position while a second subset of the plurality of A-frames may be in the vertical upright position.

12. The system of claim 11, wherein the first subset comprises adjacent A-frames and the second subset comprises adjacent A-frames and the system can carry a first payload and a second payload simultaneously.

13. The system of claim 1, wherein the trailer further comprises reinforced crossbeams on an underside of the trailer to support the recessed well of the trailer.

* * * * *